United States Patent [19]

Homan et al.

[11] 4,066,603

[45] Jan. 3, 1978

[54] SULFUR CONTAINING SILICONE ELASTOMER AND METHOD OF PREPARATION

[75] Inventors: Gary R. Homan; Chi-Long Lee, both of Midland, Mich.

[73] Assignee: Dow Corning Corporation, Midland, Mich.

[21] Appl. No.: 663,325

[22] Filed: Mar. 3, 1976

[51] Int. Cl.$^2$ .............................................. C08G 77/04
[52] U.S. Cl. .......................... 260/37 SB; 260/46.5 E; 260/46.5 G; 260/46.5 UA
[58] Field of Search .................. 260/46.5 UA, 46.5 E, 260/46.5 G, 37 SB

[56] References Cited

U.S. PATENT DOCUMENTS 3,816,282   6/1974   Viventi ........................... 260/46.5 G
3,873,499   3/1975   Michael et al. ................. 260/46.5 G

FOREIGN PATENT DOCUMENTS 2,008,426   9/1970   Germany.

OTHER PUBLICATIONS

Noll, Chemistry and Technology of Silicones, Academic Press, N.Y., 1968, pp. 400–405.

*Primary Examiner*—Melvyn I. Marquis
*Attorney, Agent, or Firm*—Roger H. Borrousch

[57] ABSTRACT

Mixing a polydimethylsiloxane having terminal vinyl groups or silacyclopentenyl groups, a mercaptoorganopolysiloxane and an organic peroxide provides a composition which cures to an elastomer at room temperature or by heating. The elastomers are useful as sealants and rubber articles.

19 Claims, No Drawings

SULFUR CONTAINING SILICONE ELASTOMER AND METHOD OF PREPARATION

BACKGROUND OF THE INVENTION

1. Field of the Invention

This invention relates to silicone elastomers containing sulfur and methods of their preparation.

2. Description of the Prior Art

Compositions containing mercaptoorgano functional siloxanes and aliphatically unsaturated organosiloxanes have been described in the prior art. For example, Vanderlinde in U.S. Pat. No. 3,445,419 teaches compositions which are made by reacting an ester of an organic polyol and an acid of the formula

HOOCR"SH where R" is a divalent alkyl radical with a vinyl terminated organopolysiloxane. The resulting product cures at room temperature. Further, Vanderlinde discloses combining the reaction product to the ester and the vinyl terminated organopolysiloxane with vinyl terminated organopolysiloxane and organic peroxide.

Viventi in U.S. Pat. No. 3,816,282 teaches silicone rubber compositions which cure at room temperature in the presence of electromagnetic and particulate radiation. The compositions exposed to the radiation for curing comprise an organopolysiloxane having a viscosity of 100 to 100,000 centipoise at 25° C., 0.1 to 2.0 mole percent of the organic groups as silicon-bonded vinyl radicals and from 1.98 to 2.05 organic groups per silicon atom, an organopolysiloxane fluid having the formula

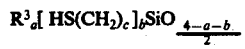

$$R^3_a[HS(CH_2)_c]_b SiO_{\frac{4-a-b}{2}}$$

where $R^3$ is alkyl or aryl of up to 18 carbon atoms, $c$ is 1 to 25, $a$ is from 0.088 to 2.08, $b$ is from 0.009 to 0.97 and $a + b$ is from 2.019 to 2.16 and the number of mercapto siloxane units equal or exceed the number of non mercapto siloxane units, and from 0.025% to 1% by weight of the composition of a free radical source which includes certain organic peroxides.

Bazant et al. in German Patent Publication (OLS) No. 2,008,426 discloses five different possibilities to make three dimensionally crosslinked silicone polymers. These reactions were found to proceed in the presence of radical reaction initiators at a temperature of 30°-110° C or by UV light initiation. The five possibilities are defined as follows: One possibility is a reaction between alkenylsiloxanes of the general formula

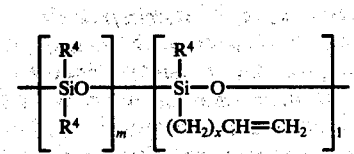

I where $m + 1$ is greater than 30, $l:m$ is from 1:10 to 1:60, $x$ is 0 to 4 and $R^4$ is alkyl groups of 1 to 6 carbon atoms, cycloalkyl groups of 5 to 8 carbon atoms, aryl groups or siloxy groups, and dithiols of the general formula

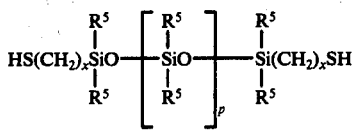

II where $p$ is 0 to 30, $x$ is 1 to 4 and $R^5$ is alkyl groups of 1 to 6 carbon atoms, cycloalkyl groups of 5 to 8 carbon atoms or aryl groups.

The second possibility is reactions between alkenylsiloxanes of the general formula I and high molecular thioalkylpolysiloxanes of the general formula

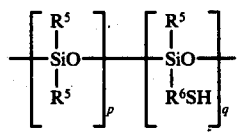

III where $p + q$ is greater than 30, $q:p$ is 1:10 to 1:60, $R^5$ is defined above and $R^6$ is an alkylene group of 1 to 6 carbon atoms, a cycloalkylene group of 5 to 8 carbon atoms or an arylene group.

The third possibility is reactions between the thioalkylpolysiloxanes of the general formula III and low molecular alkenylsiloxanes of the general formula

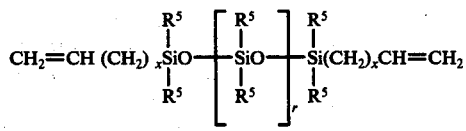

IV where $r$ is 0 to 30, $x$ is 0 to 4 and $R^5$ is defined above.

The fourth possibility is reactions of high molecular thioalkyl- and alkenyl substituted siloxanes of the general formula

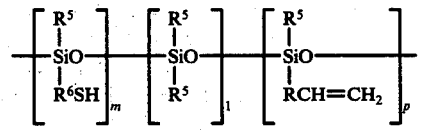

where $m + 1 + p$ is greater than 30, $m:p$ is 1 to 1:60, and $R^5$ and $R^6$ are as defined above.

The fifth possibility is reactions between thioalkylpolysiloxanes and organic diisocyanates.

George A. Gant in U.S. patent application Ser. No. 401,791, filed Sept. 28, 1973, entitled "UV Curable Compositions" and assigned to the same assignee as the present application, discloses a composition which is curable with ultraviolet light consisting essentially of a siloxane having 0.1 to 100 mole percent mercapto functional siloxane units of the formula

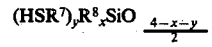

$$(HSR^7)_y R^8_x SiO_{\frac{4-x-y}{2}}$$

and any other siloxane unit being of the formula

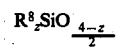

$$R^8_z SiO_{\frac{4-z}{2}}$$

V where $x$ is 0 to 2, $y$ is 1 to 2, $x + y$ is 1 to 3, $z$ is 0 to 3, $R^7$ is an alkylene radical and $R^8$ is a monovalent hydrocarbon radical or a monovalent halogenated hydrocarbon radical, a siloxane having 0.1 to 100 mole percent of vinyl siloxane units of the formula

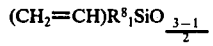

where $l$ is 0 to 2 and $R^8$ is defined above and any other non-vinyl containing siloxane units are defined by formula V, and a photosensitizing amount of a photosensitizer, where the ratio of vinyl to mercapto is from 1:100 to 100:1.

Although the prior art describes that compositions containing mercapto functional siloxanes and vinyl containing siloxanes can be cured and that some compositions cure to elastomeric products, it is not obvious that certain compositions can be cured at room temperature as well as with heat with organic peroxide alone. For example, Vanderlinde requires the reaction between an organic mercapto containing ester and a vinyl containing siloxane before a curable product is obtained, Viventi requires specific mercapto containing siloxanes and radiation for curing his composition, Bazant et al. place strict limitations on the type of alkenyl siloxanes and mercapto siloxanes which can be combined to provide a three dimensional crosslinked siloxane and finally Gant requires the presence of a photosensitizer and ultraviolet light to cure his compositions. Thus, it was unexpected that high molecular weight alkenyl endblocked polydimethylsiloxanes and a class of mercaptoorganopolysiloxanes could be cured with organic peroxide at both room temperature and by heating.

SUMMARY OF THE INVENTION

This invention relates to compositions which are curable to elastomers at room temperature and with heat where the compositions comprise a polydimethylsiloxane having a viscosity at least 0.3 Pa·s at 25° C and endblocked with siloxy units having olefinic unsaturation, a mercaptoorganopolysiloxane having no more than 16 weight percent —SH group and at least two sulfur atoms per molecule and a molecular weight greater than 1000, and an organic peroxide.

This invention also relates to a method of preparing an elastomer by mixing the polydimethylsiloxane, the mercaptoorganopolysiloxane and the organic peroxide below a temperature of 50° C and curing at a temperature above 20° C.

The low viscosity compositions can be used as sealants which have good adhesion and the higher viscosity and gum consistency compositions can be used as elastomers which cure with non-tacky surfaces and do not have some of the inhibitions of conventional peroxide cure silicone elastomers or the compositions which are cured with SiH containing siloxanes and platinum catalyst.

DESCRIPTION OF THE INVENTION

This invention relates to a composition curable to an elastomer comprising a material prepared by mixing (A) 5 to 95 weight percent based on the combined weight of (A) and (B) of a polydimethylsiloxane having a viscosity of at least 0.3 Pa·s at 25° C and being endblocked with a siloxy unit selected from the group consisting of methylphenylvinylsiloxy units, dimethylvinylsiloxy units and units of the formula

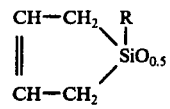

wherein R is a monovalent radical selected from the group consisting of alkyl radicals of from 1 to 3 carbon atoms inclusive and phenyl radicals, (B) 5 to 95 weight percent based on the combined weight of (A) and (B) of a mercaptoorganopolysiloxane consisting essentially of a combination of units selected from dimethylsiloxane units, trimethylsiloxane units, units of the formula

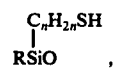

units of the formula

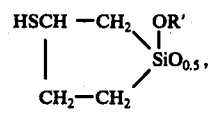

units of the formula

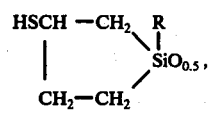

units of the formula

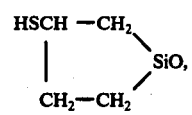

units of the formula

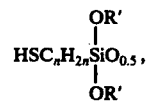

and units of the formula

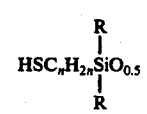

wherein R is defined above, R' is methyl or ethyl and $n$ has a value of from 1 to 4 inclusive, there being in said mercaptoorganopolysiloxane an average of at least two sulfur containing siloxane units per molecule and no more than 16 weight percent —SH groups based on the weight of the mercaptoorganopolysiloxane, the molecular weight of the mercaptoorganopolysiloxane being at least 1,000, the amount of (A) and (B) being combined in weight ratios sufficient to provide a molar ratio of moles of —SH group in (B) per mole of C≡C bond in (A) of 0.1:1 to 15:1, (C) 1.4 to 5.5 parts by weight organic peroxide based on 100 parts by weight of (A) and (B) combined.

The compositions to the present invention are prepared by mixing the ingredients (A), (B) and (C). The resulting mixtures undergo some reaction as soon as they are mixed, but have a reasonable pot life to be useful. Inasmuch as, crosslinking reaction begins upon mixing the combination of (A), (B) and (C) should not be prepared too far in advance of the time cure is desired. Thus, one should determine the pot life by using small samples for each composition prior to compounding large batches of the compositions defined herein. The pot life can range from a few hours up to several weeks at room temperature. The compositions of this invention are thus two component or two package compositions for purposes of storage. One can combine (A) and (C), and optionally a filler for one package and (B) as a second package or one can combine some of (A), (C) and optionally some filler in one package and in a second package combine the remainder of (A) and the remainder of the filler and (B). Various combinations can be used for purposes of storage, however it is cautioned that the combination of (B) and (C) may result in gelation of that mixture on storage.

Preferably, (A), (B) and (C) are mixed at a temperature below 50° C. so that one does not activate the organic peroxide prematurely and cause gelation or curing during the mixing procedure.

After (A), (B) and (C) are mixed, the composition will cure at room temperature, above 20° C. Compositions which have a molar ratio of moles of —SH group in (B) per mole of C═C bond in (A) of from 1:1 to 15:1 are best cured in the presence of oxygen gas, such as air. Those compositions which have a molar ratio of moles of —SH group in (B) per mole of C═C bond in (A) of from 0.1:1 up to but not including 1:1 are best cured in the absence of oxygen gas by heating. These compositions with a molar ratio of —SH to C═C of 0.1:1 up to 1:1 are best cured by heating above 50° C.

The type of mixing procedure is not critical as long as it does not generate excessive heating. For high viscosity composition, such as those containing gums or high filler loadings, a two-roll mill can be used for mixing but is preferably cooled, such as the internal water cooled type. Also the composition can be combined and mixed by using a multi-feed extruder wherein two or more components can be fed in a mixer and the composition is extruded from the apparatus. The resulting extruded article can be then left to cure at room temperature or it can be heated to accelerate the cure.

The polydimethylsiloxanes of (A) can have a viscosity of at least 0.3 pascal-second (Pa·s) at 25° C, which have a degree of polymerization in excess of 100 units. The polydimethylsiloxanes can range from fluids to gums. The lower viscosity polydimethylsiloxanes, such as from 0.3 to 35 Pa·s at 25° C., can be used for compounding flowable sealant compositions and liquid injection molding compositions. The higher molecular weight polydimethylsiloxanes such as those of gum consistency are particularly useful for making extrudable compositions. The polydimethylsiloxanes are endbocked with methylphenylvinylsiloxy units, dimethylvinylsiloxy units or silacyclopentenyl siloxy units of the formula

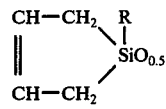

where R is an alkyl radical of 1 to 3 carbon atoms inclusive, including methyl, ethyl and propyl or phenyl. The silacyclopentenylsiloxy units defined by the above formula includes two isomers, namely

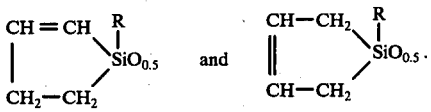

The preparation of the silacyclopentenyl usually results in a mixture of isomers. Inasmuch as, there is no problem in using the mixture, therefore separation is not attempted. The silacyclopentenyl containing copolymers are known in the art from U.S. Pat. No. 3,509,191 which is hereby incorporated by reference to show the copolymers endblocked with siloxy units which have the silacyclopentenyl structure.

The polydimethylsiloxane copolymers having methylphenylvinylsiloxy units or dimethylvinylsiloxy units are well known in the art.

The mercaptoorganopolysiloxanes of (B) contain combinations of two or more of the following units: dimethylsiloxane units, trimethylsiloxane units, and units of the formulae

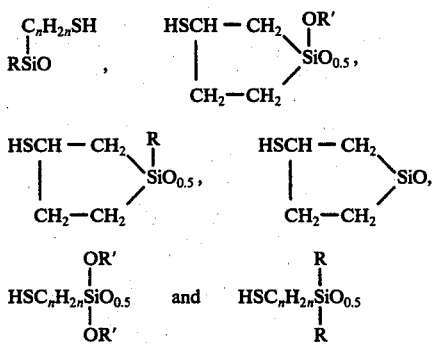

where R is an alkyl of 1 to 3 carbon atoms including methyl, ethyl and propyl, or phenyl, R' is methyl or ethyl and n is 1 to 4 inclusive, preferably n is 3 and R and R' are methyl. The mercaptoorganopolysiloxanes for use in the present invention are those which have at least two sulfur atoms per molecule and no more than 16 weight percent —SH group based on the weight of the mercaptoorganopolysiloxane, and a molecular weight of at least 1000. Preferably, the mercaptoorganopolysiloxanes have a molecular weight greater than 5000 and no more than 3.5 weight percent —SH group and the most preferred are those with no more than 2.2 weight percent —SH group. The mercaptoorganopolysiloxanes are known in the art as evidenced by the prior art cited herein. the silacyclopentane mercapto siloxanes can be prepared by the method defined in U.S. Pat. No. 3,655,713 which is hereby incorporated by reference to show the silacylopentane mercapto siloxanes and their preparation. The mercaptoorganosiloxanes which contain endblocking units of the formula $$\text{HSC}_n\text{H}_{2n}\overset{\overset{\displaystyle OR'}{|}}{\underset{\underset{\displaystyle OR'}{|}}{Si}}O_{0.5}$$

can be prepared by reacting a hydroxyl endblocked polydimethylsiloxane and a mercaptoalkyl trialkoxysilane of the formula $$\text{HSC}_n\text{H}_{2n}\text{Si}(OR')_3$$

in the presence of solid potassium hydroxide or potassium silanolate catalysts. The potassium silanolate catalyst is preferred for the higher viscosity polydimethylsiloxanes. the mercaptoalkyltrialkoxysilane is preferably used in excess of about 10 weight percent over stoichiometric amounts. The resulting product is essentially a polydimethylsiloxane endblocked with the units of the formula $$\text{HSC}_n\text{H}_{2n}\overset{\overset{\displaystyle OR'}{|}}{\underset{\underset{\displaystyle OR'}{|}}{Si}}O_{0.5}$$

but there may be some small amounts of units wherein two SiOH groups have reacted with one mercaptoalkyltrialkoxysilane molecule, but these amounts are small enough that the character of the endblocked polydimethylsiloxane is not noticeably altered.

The organic peroxide of (C) can be any of the conventional organic peroxides, such as 2,4-dichlorobenzoyl peroxide, tertiary-butyl perbenzoate, benzoyl peroxide, di-tertiary-butyl peroxide, tertiary-butyl peroctoate, dicumyl peroxide and 2,5-bis(tertiary-butylperoxy)-2,5-dimethylhexane.

Fillers are preferably used in the compositions of this invention, but are not required. The fillers can be both treated and untreated reinforcing fillers, such as fume silica and fume silica having triorganosiloxy groups, such as trimethylsiloxy groups on the surface, carbon black or precipitated silica, and extending fillers such as crushed or ground quartz, diatomaceous earth, and calcium carbonate.

The compositions of the present invention are made by mixing 5 to 95 weight percent of (A) and 5 to 95 weight percent of (B) where 100 weight percent is the combined weight of (A) and (B). In addition to the weight ratio range, (A) and (B) are mixed to provide a molar ratio of moles of —SH group in (B) per mole of C=C bond in (A) of 0.1:1 to 15:1. As stated above, those combinations of (A) and (B) which have a molar ratio of —SH per C=C of 0.1:1 up to but not including 1:1 are cured in the absence of oxygen gas. Such compositions are particularly used as liquid injection molding compositions. Those compositions with a molar ratio of —SH to C=C of 1:1 to 15:1 are cured in the presence of oxygen gas. The compositions of this invention also contain from 1.4 to 5.5 parts by weight of organic peroxide (C) per 100 parts by weight of (A) and (B) combined. The compositions can also contain filler up to 100 parts by weight per 100 parts by weight of (A) and (B) combined. Particularly, useful compositions are those which contain from 40 to 90 weight percent (A) and 10 to 60 weight percent (B).

One particularly unique class of compositions are those prepared by using only polydimethylsiloxanes endblocked with units of the formulae

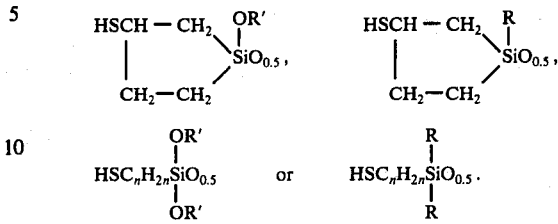

The compositions of this invention cure to elastomers either at room temperature or with heating, such as hot air vulcanization. The resulting elastomer has a dry or non-tacky surface. Air inhibition which is observed with conventional non-mercapto-containing peroxide cured silicone rubber composition is not observed and the inhibition by various materials such as sulfur and phosphorus in the platinum catalyzed compositions containing aliphatic unsaturated siloxanes and SiH containing siloxanes, is not observed. The elastomers have excellent unprimed adhesion to many substrates with either room temperature cure or heat cure as shown by cohesive failure.

The following examples are presented for illustrative purposes and should not be construed as limiting the invention which is properly delineated in the claims.

EXAMPLE 1

A composition was prepared by mixing 10 g. of a methylphenylvinylsiloxy endblocked polydimethylsiloxane having a viscosity range of 0.3 to 0.5 Pa·s at 25° C. and a vinyl content of 0.5 weight percent, 2.9 g. of a gamma-mercaptopropyldimethoxysiloxy endblocked polydimethylsiloxane having 2.1 weight percent —SH group, and 0.5 g. of tertiary-butyl perbenzoate. The molar ratio of —SH to vinyl was 1:1. The composition was heated at 100° C. for 3.5 hours exposed to air and cured to a bubble free rubber with a dry surface. The gamma-mercaptopropyldimethoxysiloxy endblocked polydimethylsiloxane was prepared by heating 200 g. of a hydroxyl endblocked polydimethylsiloxane having 1.58 weight percent hydroxyl group, in the range of 50° to 70° C. adding to the stirred polydimethylsiloxane, 40.10 g. of gamma-mercaptopropyltrimethoxysilane and 0.03 g. granulated potassium hydroxide. The pressure in the reaction container was reduced to 13,330 pascals and the reaction continued for 2 hours. The resulting product was stripped at 120° C. and 13,330 pascals for 15 minutes, dry ice was added to deactivate the potassium catalyst and the contents filtered. The filtrate was the gamma-mercaptopropyldimethoxysiloxy endblocked polydimethylsiloxane defined above.

EXAMPLE 2

A sealant composition was prepared by mixing 10 g. of a polydimethylsiloxane endblocked with units of the formula

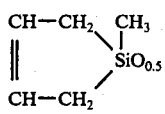

and having 0.56 weight percent —CH$_2$—CH=•CH—CH$_2$— group, 3.3 g. of the mercaptosiloxane defined in Example 1 and 0.5 g. of tertiary-butyl perbenzoate. The molar ratio of —SH to C=C was 1:1. The composition was cured in the open air by heating at 100° C. for 6 hours and a bubble free rubber with a dry surface was obtained.

EXAMPLE 3

A sealant was prepared by mixing 10 g. of the vinyl endblocked polydimethylsiloxane defined in Example 1, 2.89 g. of the mercapto siloxane defined in Example 1 and 0.5 g. of 2,5-bis(tertiary-butylperoxy)-2,5-dimethylhexane and thereafter heating the resulting composition in the open air at 150° C. for 30 minutes. A bubble free rubber was obtained which had a slightly tacky surface which became completely dry when the rubber was left exposed to air at room temperature for two days.

EXAMPLE 4

A sealant was prepared by mixing 10 g. of the C=C containing polydimethylsiloxane of Example 2, 3.23 g. of the mercapto siloxane defined in Example 1 and 0.5 g. of di-tertiary-butyl peroxide and then heating the resulting composition in the open air at 150° C. for 4 hours. A bubble free rubber with a tacky surface was obtained. The surface of the rubber became dry after leaving the rubber exposed to air at room temperature for two days.

EXAMPLE 5

A. A sealant was prepared by mixing 5 g. of the vinyl endblocked polydimethylsiloxane defined in Example 1, 3.8 g. of a polydimethylsiloxane having a viscosity of about 5.36 · 10$^{-4}$ meter$^2$/second (m$^2$/s) at 25° C and having endblocking units which consist of 85 mol percent units of the formula

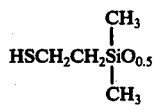

and 15 mol percent units of the formula

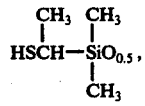

and 0.25 g. of tertiary-butyl perbenzoate and thereafter heating the resulting composition exposed to air at 100° C. for 30 minutes. An elastomer with a tacky surface was obtained and the tacky surface became completely dry after two days exposure to air at room temperature. The vinyl containing siloxane and mercaptosiloxane were mixed to provide a molar ratio of —SH to vinyl of 1 to 1.

B. An equivalent sealant was obtained when the vinyl containing polydimethylsiloxane of A. was replaced with the C=C containing polydimethylsiloxane of Example 2 when cured for 30 minutes at 150° C.

EXAMPLE 6

A sealant was prepared by mixing 10 g. of the vinyl endblocked polydimethylsiloxane defined in Example 1, 0.78 g. of a siloxane polymer consisting of an average of two moles of trimethylsiloxy units, three moles of dimethylsiloxane units and five moles of (gamma-mercaptopropyl)methylsiloxane units, and 0.5 g. of 2,5-bis(tertiarybutylperoxy)-2,5-dimethylhexane. The resulting composition was cured by heating for 15 minutes at 150° C. resulting in an elastomer with a tacky surface which became dry after standing at room temperature overnight.

EXAMPLE 7

A. A sealant was prepared by mixing 10 g. of a methylphenylvinylsiloxy endblocked polydimethylsiloxane having a viscosity range of 1.8 to 2.4 Pa·s at 25° C. and a vinyl content of 0.25 weight percent, 10 g. of a trimethylsiloxy endblocked copolymer containing dimethylsiloxane units and (gamma-mercaptopropyl)methylsiloxane units with an —SH content of 2.08 weight percent and a viscosity of 2.028 × 10$^{-3}$ m$^2$/s, and 1 g. of tertiary-butyl perbenzoate. The resulting composition cured to a rubber with a dry surface when heated at 150° C. for 30 minutes or when heated at 100° C. for 60 minutes.

B. An equivalent sealant was obtained when tertiary-butyl peroctoate was substituted for tertiary-butyl benzoate of A. The composition cured to an elastomer with a dry surface when heated at 100° C. for 25 minutes.

EXAMPLE 8

A. A sealant was prepared as described in Example 7, A. except it also contained 10 g. of five micron quartz filler. This sealant cured to a rubber with a dry surface in 3 days at room temperature.

B. A sealant was prepared as described in A. above except the 1 g. of tertiary-butyl perbenzoate was replaced with 3 g. of a peroxide mixture containing 35 weight percent 2,4-dichlorobenzoyl peroxide and 65 weight percent of a mixture of dibutylphthalate and quartz filler. The sealant cured overnight at room temperature to an elastomer with a tack free surface.

C. A sealant was prepared as described in Example 7, A., except the 1 g. of tertiary butyl perbenzoate was replaced with 0.75 g. of a peroxide mixture which is 50 percent 2,4-dichlorobenzoyl peroxide and 50 percent inert carrier. The sealant cured at room temperature in six days to an elastomer with a dry surface.

EXAMPLE 9

A sealant was prepared by making a first mixture of 200 g. of the vinyl containing polydimethylsiloxane defined in Example 7, A., 50 g. of 5 micron quartz filler and 60 g. of the peroxide mixture defined in Example 8, B., a second mixture was prepared by mixing 200 g. of the mercapto siloxane defined in Example 7, A. and 50 g. of 5 micron quartz filler, and then equal weights of the first and second mixtures were mixed to make a sealant composition. The sealant composition cured to an elastomer with a dry surface in 11 hours at room temperature, in 5 minutes at 150° C. and in 10 seconds at 175° C. The sealant composition had a snap time of 7 hours at room temperature. Snap time is the point at which a composition first begins to show elastomeric properties as shown by its ability to recover. Samples of the first and second mixtures were stored for six months without any noticeable change and when mixed, cured in equivalent times as when first prepared.

EXAMPLE 10

Sealant compositions were prepared by mixing 50 g. of the vinyl containing polydimethylsiloxane defined in Example 7, A., with an amount as shown in the Table of mercapto siloxane defined in Example 7, A., 10 g. of 5 micron quartz filler and 7.5 g. of the peroxide mixture defined in Example 8, B. The molar ratio of —SH to vinyl was as shown in the Table and the snap time at room temperature was as shown in the Table. All of the sealant compositions cured to an elastomer with a tack free surface in less than 24 hours, except Composition 1 which required more than 24 hours to cure to a tack free surface elastomer.

Table

| Composition No. | Mercapto siloxane, g. | Molar Ratio, —SH/CH$_2$=CH— | Snap Time, Hours |
|---|---|---|---|
| 1 | 6.8 | 1:1 | 24 |
| 2 | 13.6 | 2:1 | 18 |
| 3 | 20.4 | 3:1 | 13.5 |
| 4 | 27.2 | 4:1 | 11.5 |
| 5 | 34.0 | 5:1 | 10 |
| 6 | 40.8 | 6:1 | 9.7 |
| 7 | 47.6 | 7:1 | 9.5 |
| 8 | 54.4 | 8:1 | 10.2 |
| 9 | 61.2 | 9:1 | 9.7 |
| 10 | 68.0 | 10:1 | 9.7 |

EXAMPLE 11

A. A sealant was prepared by mixing 100 g. of a methylphenylvinylsiloxy endblocked polydimethylsiloxane having a viscosity range of 25 to 35 Pa·s at 25° C., 27.2 g. of the mercapto siloxane defined in Example 7, A., 15 g. of the peroxide mixture defined in Example 8, B. and 20 g. of a fume silica filler having its surface treated with trimethylsiloxy groups. The resulting composition cured overnight at room temperature to a rubber with a dry surface and also cured to a rubber with a dry surface by heating at 150° C. for 15 minutes.

B. A sealant was prepared as described in A. above, except 8.2 g. of the mercapto siloxane was used in place of the 27.2 g. The composition cured in an equivalent manner.

EXAMPLE 12

A curable composition was prepared by mixing 96.59 g. of a methylphenylvinylsiloxy endblocked polydimethylsiloxane having a viscosity range of 8 to 12 Pa·s at 25° C. and 0.13 weight percent vinyl group, 3.4 g. of a trimethylsiloxy endblocked copolymer containing dimethylsiloxane units and (gamma-mercaptopropyl)methylsiloxane units with an —SH content of 2.25 weight percent, 30.0 g. of a fume silica filler having its surface treated with trimethylsiloxy groups and 7.5 g. of the peroxide mixture defined in Example 8, C. At room temperature, the resulting composition did not cure completely, but at 150° C. exposed to air, an elastomer was obtained with a tacky surface. The composition cured to a good elastomer with a dry surface by press curing for 15 minutes at 175° C.

That which is claimed is:
1. A composition curable to an elastomer comprising a material prepared by mixing
   A. 5 to 95 weight percent based on the combined weight of (A) and (B) of a polydimethylsiloxane having a viscosity of at least 0.3 Pa·s at 25° C. and being endblocked with a siloxy unit selected from the group consisting of methylphenylvinylsiloxy units, dimethylvinylsiloxy units and units of the formula

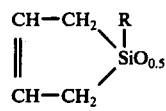

wherein R is a monovalent radical selected from the group consisting of alkyl radicals of from 1 to 3 carbon atoms inclusive and phenyl radicals,
   B. 5 to 95 weight percent based on the combined weight of (A) and (B) of a mercaptoorganopolysiloxane consisting essentially of a combination of units selected from dimethylsiloxane units, trimethylsiloxane units, units of the formula

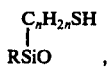

units of the formula

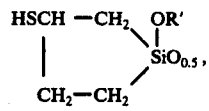

units of the formula

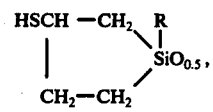

units of the formula

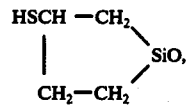

units of the formula

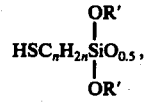

and units of the formula

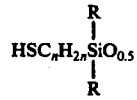

wherein R is defined above, R' is methyl or ethyl and $n$ has a value of from 1 to 4 inclusive, there being in said mercaptoorganopolysiloxane an average of at least two sulfur containing siloxane units per molecule and no more than 16 weight percent —SH groups based on the weight of the mercaptoorganopolysiloxane, the molecular weight of the mercaptoorganopolysiloxane being at least 1,000, the amount of (A) and (B) being combined in weight ratios sufficient to provide a molar ratio of moles of —SH group in (B) per mole of C═C bond in (A) of 0.1:1 to 15:1, C. 1.4 to 5.5 parts by weight organic peroxide based on 100 parts by weight of (A) and (B) combined.

2. The composition according to claim 1 in which there is up to 100 parts by weight of a filler based on 100 parts by weight of (A) and (B) combined.

3. The composition according to claim 1 in which (A) and (B) are combined in sufficient amounts to provide a molar ratio of moles of —SH group in (B) per mole of C=C bond in (A) of 1:1 to 15:1.

4. The composition according to claim 3 in which there is up to 100 parts by weight of a filler based on 100 parts by weight of (A) and (B) combined.

5. The composition according to claim 1 in which (A) and (B) are combined in sufficient amounts to provide a molar ratio of moles of —SH group in (B) per mole of C=C bond in (A) of from 0.1:1 up to but not including 1:1.

6. The composition according to claim 5 in which there is up to 100 parts by weight of a filler based on 100 parts by weight of (A) and (B) combined.

7. The composition according to claim 1 in which the amount of —SH group does not exceed 3.5 weight percent based on the weight of the mercaptoorganopolysiloxane.

8. The composition according to claim 7 in which there is up to 100 parts by weight of a filler based on 100 parts by weight of (A) and (B) combined.

9. The composition according to claim 1 in which the amount of —SH group does not exceed 2.2 weight percent based on the weight of the mercaptoorganopolysiloxane.

10. The composition according to claim 3 in which (A) is present in an amount of from 40 to 90 weight percent based on the combined weight of (A) and (B), and (B) is present in an amount of from 10 to 60 weight percent based on the combined weight of (A) and (B).

11. The composition according to claim 10 in which the polydimethylsiloxane has a viscosity of from 0.3 to 35 Pa·s at 25° C.

12. The composition according to claim 11 in which the mercaptoorganopolysiloxane consists essentially of dimethylsiloxane units and units of the formula

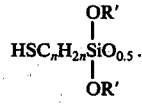

13. The composition according to claim 12 in which R' is methyl and n is 3.

14. The composition according to claim 11 in which the mercaptoorganopolysiloxane consists essentially of dimethylsiloxane units and units of the formula

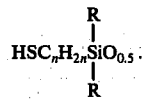

15. The composition according to claim 14 in which R is methyl and n is 3.

16. A method of preparing an elastomer comprising
I. mixing at a temperature below 50° C.
   A. 5 to 95 weight percent based on the combined weight of (A) and (B) of a polydimethylsiloxane having a viscosity of at least 0.3 Pa·s at 25° C. and being endblocked with a siloxy unit selected from the group consisting of methylphenylvinylsiloxy units, dimethylvinylsiloxy units and units of the formula

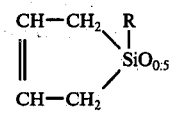

wherein R is a monovalent radical selected from the group consisting of alkyl radicals of from 1 to 3 carbon atoms inclusive and phenyl radicals, B. 5 to 95 weight percent based on the combined weight of (A) and (B) of a mercaptoorganopolysiloxane consisting essentially of a combination of units selected from dimethylsiloxane units, trimethylsiloxane units, units of the formula

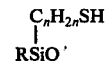

units of the formula

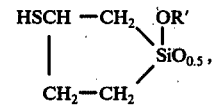

units of the formula

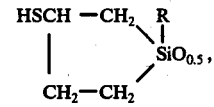

units of the formula

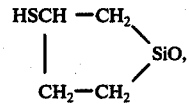

units of the formula

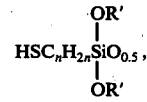

and units of the formula

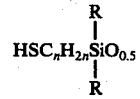

where R is defined above, R' is methyl or ethyl and n has a value of from 1 to 4 inclusive, there being in said mercaptoorganopolysiloxane an average of at least two sulfur containing siloxane units per molecule and no more than 16 weight percent —SH groups based on the weight of the mercaptoorganopolysiloxane, the molecular weight of the mercaptoorganopolysiloxane being at least 1,000, the amount of (A) and (B) being combined in weight ratios sufficient to provide a molar ratio of moles of —SH group in (B) per mole of C═C bond in (A) of 0.1:1 to 15:1, C. 1.4 to 5.5 parts by weight organic peroxide based on 100 parts by weight of (A) and (B) combined thereafter II. curing the resulting mixture of (I) above 20° C.

17. The method in accordance with claim 16 in which (A) and (B) are combined in sufficient amounts to provide a molar ratio of moles of —SH group in (B) per mole of C═C bond in (A) of 1:1 to 15:1 and in (II) the resulting mixture of (I) is cured in the presence of oxygen gas.

18. The method in accordance with claim 17 in which the resulting mixture of (I) is heated above 50° C.

19. The method in accordance with claim 16 in which (A) and (B) are combined in sufficient amounts to provide a molar ratio of moles of —SH group in (B) per mole of C═C bond in (A) of from 0.1 up to but not including 1:1 and in (II) the resulting mixture of (I) is cured in the absence of oxygen gas by heating the resulting mixture of (I) above 50° C.

* * * * *